(12) United States Patent  (10) Patent No.: US 8,370,385 B2
Srinivasa et al.  (45) Date of Patent: Feb. 5, 2013

(54) MEDIA COLLECTIONS SERVICE

(75) Inventors: Gopal Ranganatha Srinivasa, Bangalore (IN); Joseph M. Joy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 156 days.

(21) Appl. No.: 13/038,332

(22) Filed: Mar. 1, 2011

(65) Prior Publication Data

US 2012/0226708 A1    Sep. 6, 2012

(51) Int. Cl.
*G06F 17/30*    (2006.01)
(52) U.S. Cl. ........................... 707/769; 707/913
(58) Field of Classification Search .................. 715/201, 715/255, 205, 234; 707/769, 913
See application file for complete search history.

(56) References Cited

U.S. PATENT DOCUMENTS

| | | | |
|---|---|---|---|
| 7,765,192 B2 | 7/2010 | Svendsen | |
| 2004/0010755 A1* | 1/2004 | Hamada | 715/513 |
| 2005/0071736 A1* | 3/2005 | Schneider et al. | 715/500 |
| 2005/0246745 A1* | 11/2005 | Hirsch et al. | 725/74 |
| 2006/0031770 A1 | 2/2006 | McMenamin | |
| 2008/0010585 A1* | 1/2008 | Schneider et al. | 715/201 |
| 2008/0052349 A1 | 2/2008 | Lin | |
| 2008/0120546 A1 | 5/2008 | Pulier | |
| 2009/0061764 A1* | 3/2009 | Lockhart et al. | 455/3.06 |

OTHER PUBLICATIONS

TinyPic, Oct. 27, 2010, Wikipedia, retrieved Nov. 18, 2010 from http://en.wikipedia.org/wiki/TinyPic, pp. 1-2.
Seaside Software, All Media Library, (n.d.), retrieved Nov. 18, 2010 from http://www.allmedialibrary.com/AMLinfo.htm, pp. 1-9.
Microsoft Corporation, Media Library Starter Kit, (n.d.), retrieved Nov. 18, 2010 from http://www.asp.net/downloads/starter-kits/media-library, pp. 1-2.
Microsoft Corporation, Smooth streaming, (n.d.), retrieved Nov. 18, 2010 from http://www.iis.net/download/SmoothStreaming, pp. 1-3.
Internet Archive, Oct. 25, 2010, Wikipedia, retrieved Nov. 18, 2010 from http://en.wikipedia.org/wiki/Internet_Archive, pp. 1-10.

* cited by examiner

*Primary Examiner* — Jean M Corrielus
(74) *Attorney, Agent, or Firm* — Lyon & Harr, LLP; Richard T. Lyon (57) ABSTRACT

Media collections (MC) service embodiments are presented which generally facilitate access to diverse forms of media by resolving an identifier tuple assigned to a content item into a set of one or more Uniform Resource Identifiers (URIs) which point to an instance of the content item. This scheme supports the upload and query of collections of media elements such as images, audio, video, deep zoom images, photosynth and so on. In addition, the foregoing scheme affords a standard way to bind to media that persists, and makes it easier to author and play content while being flexible about where the media is located.

20 Claims, 7 Drawing Sheets

MEDIA COLLECTIONS SERVICE

BACKGROUND

Rich media applications (both interactive and non interactive) need access to diverse forms of media via the Internet, or a proprietary intranet, or on local media attached to the viewing computer. To accomplish this it is necessary to store and deliver large volumes of content. This content includes not only images, audio, video, but more complex media such as a deep zoom image, or a photosynth, or a memory dump file, or an XML text file, and so on. This more complex content may be composed of thousands of elements.

SUMMARY

Media collections (MC) service embodiments described herein generally facilitate access to diverse forms of media by resolving an identifier tuple assigned to a content item into a set of one or more Uniform Resource Identifiers (URIs) which point to an instance of the content item. In one implementation of a system to accomplish this task, a back-end server acts as a master repository for a MC service configuration and a MC database. The MC service configuration sets up an instance of a MC service on a front-end server, and the MC database includes a listing of identifier tuples each of which is assigned to a content item and each of which is associated with a set of one or more URIs that point to locations where an instance of the identified content item can be obtained. There are multiple front end servers which interface with the back-end server and which each comprise an instance of the MC service set-up by the back-end server. Each front-end server also has access to a copy of the MC database as provided by the back-end server.

The front-end servers each receive queries from a subscriber that includes one or more identifier tuples. The front-end server receiving such a query uses the resident instance of the MC service and the MC database to provide one or more URIs associated with the received identifier tuple to the subscriber. In addition, each front-end server can receive a query from a content author requesting permission to perform tasks involving the creation or manipulation of an identifier tuple, and the specifying or uploading of content.

From the perspective of a subscriber wishing to access a content item, in one implementation the subscriber's computing device accesses a subscriber configuration file previously obtained from the MC service. This subscriber configuration file is used to create an instance of a MC subscriber client, which is in turn used to initiate communications with the MC service. The subscriber submits a query to the MC service that includes an identifier tuple which identifies a content item the subscriber wants to obtain (if the content item is not stored locally to the subscriber). When such a query is submitted, the subscriber receives a set of one or more URIs from the MC service which point to separate instances of the content item corresponding to the identifier tuple presented to the MC service in the query. The subscriber then uses the URI or URIs to access the desired content item.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

In the following description of media collection service embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Media Collection Service

In general, the media collections service embodiments described herein (which will be referred to as a MC service for short) support the upload and query of collections of data and media elements (such as images, audio, video, and so on). The MC service resolves identifiers issued to content items into URIs that can be used by a subscriber client to access the items.

In addition, the foregoing scheme affords a standard way to bind to media that persists, and makes it easier to author and play content while being flexible about where the media is located. Still further, to enhance security and maintainability, in one implementation a single view that has all the required data in a read-only database is exposed to the subscriber client using odata queries. Making the database read-only prevents injection attacks.

1.1 MC Service Architecture

Figure 1:
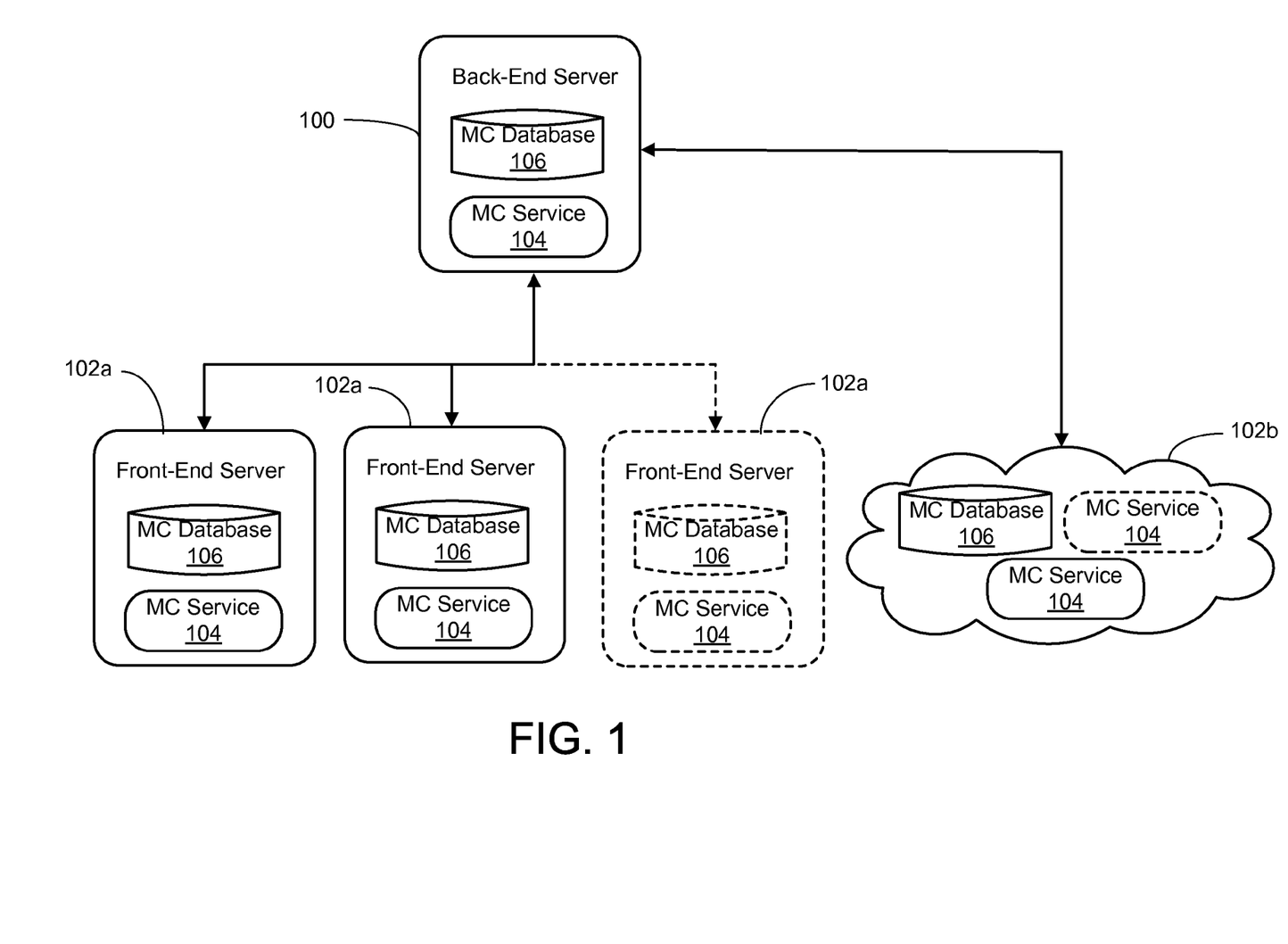
FIG. 1 is a simplified architectural diagram of one implementation of a media collections (MC) service.

One implementation of an architecture for the MC service is shown in FIG. 1. Generally, there are multiple front-end servers 102*a-b* whose content and configuration are setup by a master repository back-end server 100. The front end servers 102*a-b* are replicates with regard to their MC service configuration 104. It is the front end servers 102*a-b* that interface with the subscribers of the MC service. The master repository back-end server 100 interfaces only with the front-end servers 102*a-b*. The front-end servers 102*a-b* can be hosted either on dedicated computing devices (such as those described in the Exemplary Operating Environments section to follow) or in a cloud-based server scheme, or both. For example, in the exemplary architecture shown in FIG. 1, there are at least two dedicated computing devices hosting front-end servers 102a and at least one cloud-based front-end server 102b. Additional front-end servers 102a-b are shown using dashed line boxes in FIG. 1. It is noted that the architecture can be readily expanded by adding more front-end servers 102a-b as dedicated machines or cloud based instances, or both.

In addition to the MC service configuration 104 that is replicated on the front-end servers 102a-b, the master repository back-end server 100 also includes a media collections (MC) database 106. As will be described shortly, this database 106 includes the identifier tuples and the URIs corresponding to each of the content items identified by the tuples. In one implementation, shown in FIG. 1, the MC database 106 is replicated by the back-end server 100 on all of the dedicated front end servers 102a, and a copy of the database is cloud-based as well. In the case of the cloud-based copy of the MC database 106, in one implementation all the cloud-based MC service configurations 104 would share it. It is noted that in alternate implementations, the MC database 106 could be replicated on only some of the dedicated front end servers, may not be copied to a cloud-based service, or may be replicated on separate servers other than the front-end servers.

A list of available front-end servers hosting the MC service is maintained by the master repository back-end server, and provided to subscribers of the MC service and content authors via a front-end server in a subscriber configuration file or content author configuration file, respectively, as will be described in more detail shortly. When a front-end server is down, or new front-end servers are added, the configuration files are updated to reflect the situation and provided to the subscribers and content authors.

1.2 MC Abstraction

Figure 2:
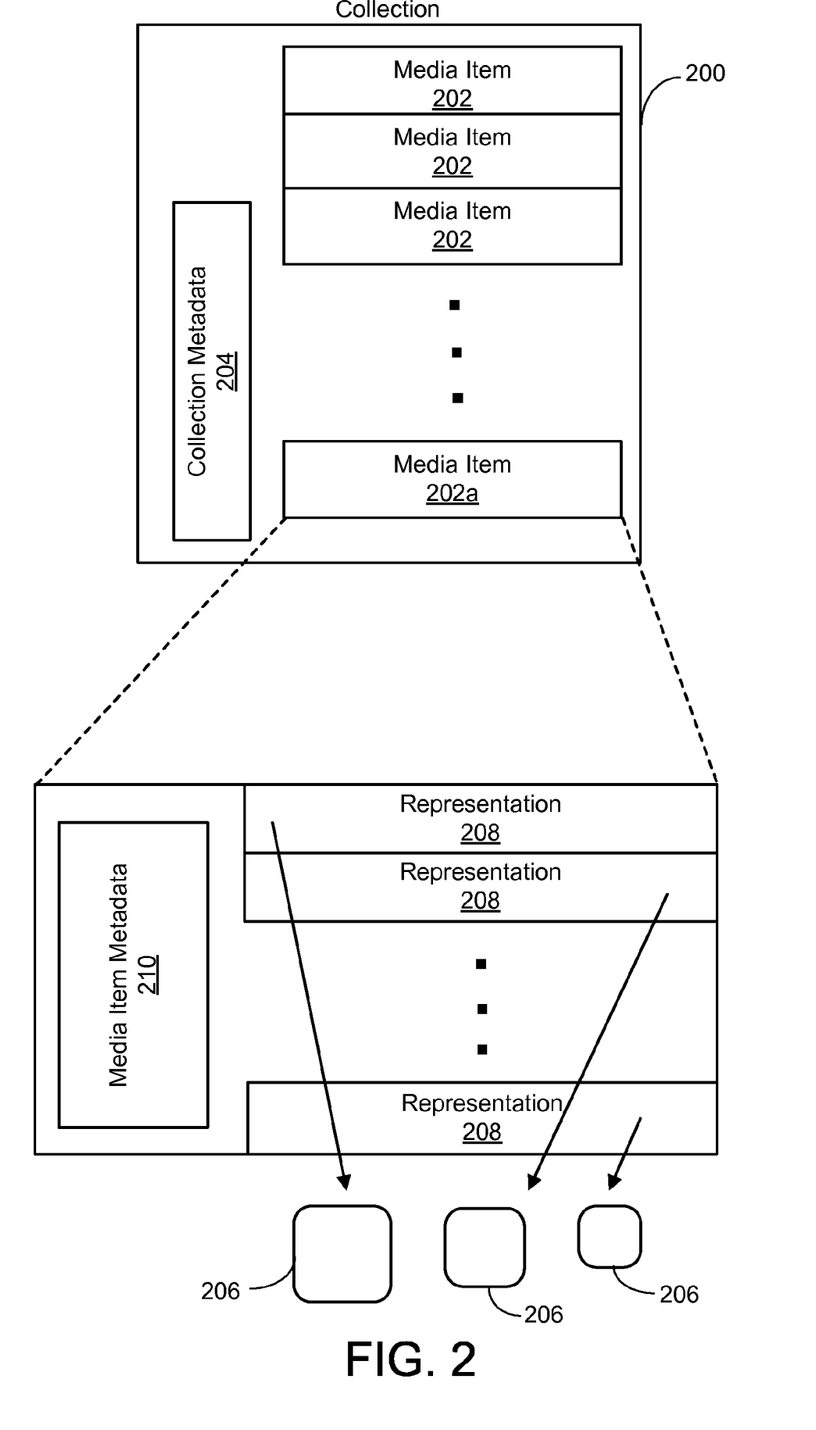
FIG. 2 is a simplified diagram of one implementation of a MC abstraction.

A primary purpose of the MC service is to store and deliver large volumes of content. To this end, content is organized and indexed using an abstraction. The central component of this abstraction is referred to as a media collection. In one implementation, as shown in FIG. 2, a media collection 200 includes a set of one or more media items 202, as well as collection metadata 204 which describes the collection. Each media item (such as the expanded item 202a shown in FIG. 2) represents content 206, such as text, image or video. This content 206 can also have complex structure, such as a deep zoom image, or a photosynth, or a HTML page with embedded Cascading Style Sheets (CSS)/Javascript/images, or a memory dump file potentially made up of multiple dump files, or an XML file that has metadata, and so on. A single item (e.g., 202a) includes a set of one or more representations 208 of the content 206. For example, a set of representations 208 could point to the same content in different resolutions, alternative file formats, different languages, and so on. In addition, each media item 202, 202a includes item metadata 210, which describes the item and its representations 208.

Each media item representation (i.e., content item) is assigned a unique identifier. For example, in one implementation, the media collections service embodiment assigns each media item representation an identifier tuple that includes at least a collection identity (collectionID), a media item identity (itemID) and a content reference identity (contentID). The collection identity identifies the particular media collection to which the media item being identified belongs. The item identity identifies the particular media item being identified in the collection. And, the content reference identity identifies a particular representation of the media item being identified. Thus, each representation of each media item in each media collection is uniquely identified by the foregoing identifier tuple (collectionID, itemID, contentID). Each identifier tuple is also associated with a set of one or more URIs that point to a location or locations where the identified media item representation can be retrieved.

In addition, in one implementation, the identifier tuple also includes an authority identity (authorityID) element. An authority identity provides scope for collections—i.e. identifies them as being owned by a single entity.

It is noted that while the foregoing description of the identifier tuple indicated that it included at least a collectionID, itemID and contentID so as to refer to a particular media item representation (i.e., content item), in one implementation, more general identifier tuples are possible. For example, the identifier tuple could include just the collection ID, thus requesting information for all the media item representations in a particular collection. The identifier tuple could also just include collectionID and the itemID. In this latter case, the subscriber would be requesting information for all the representations of the identified media item in the identified collection. In one implementation, the MC service also supports a query for metadata. For instance, a query can include a collection ID, item ID and a "ContentSelectionCondition" which is a condition on metadata. The service will return only those content items that satisfy the condition specified. Similarly, another query can be issued with just the collection ID and a set of conditions which returns the set of items belonging to the collection that satisfy the condition. As a concrete example, the response to a query can return only those content items of an item identified as: {collectionID, itemID} where the language is 'X'.

In most cases the MC service treats media items as blobs in which each representation of a media item is associated with a single URI. However, in some cases a deeper understanding of the content is needed to adequately point to a representation of a media item. For example, in the case of complex media that is made up of multiple parts (such as deep zoom images, which can be made up of thousands of individual images each with a URI pointing to the image's location), the media collections service will unpack the complex media so as to gain knowledge of all the URIs making up the complex media. In one implementation, when multi-part complex media is involved, the identifier tuple is associated not with a single URI indicating the location of a single content item, but with a set URIs pointing to components that make up the media item representation being identified.

1.3 MC Service Subscriber

A subscriber (i.e., an entity intending to consume content) accesses the MC service by making an query via a computing device (such as the computing devices described in the Exemplary Operating Environments section to follow). In one implementation, the MC service receives a subscriber query that includes one or more of the previously-described identifier tuples and returns a list of URIs that can be used to directly access the particular media item corresponding to each of the provided identifier tuples, along with, in one version, any metadata that describes the media items. The subscriber then generally accesses the desired media using delivery mechanisms appropriate for the media type. For example, this can be a http-based delivery of various MIME-type content.

Figure 3:
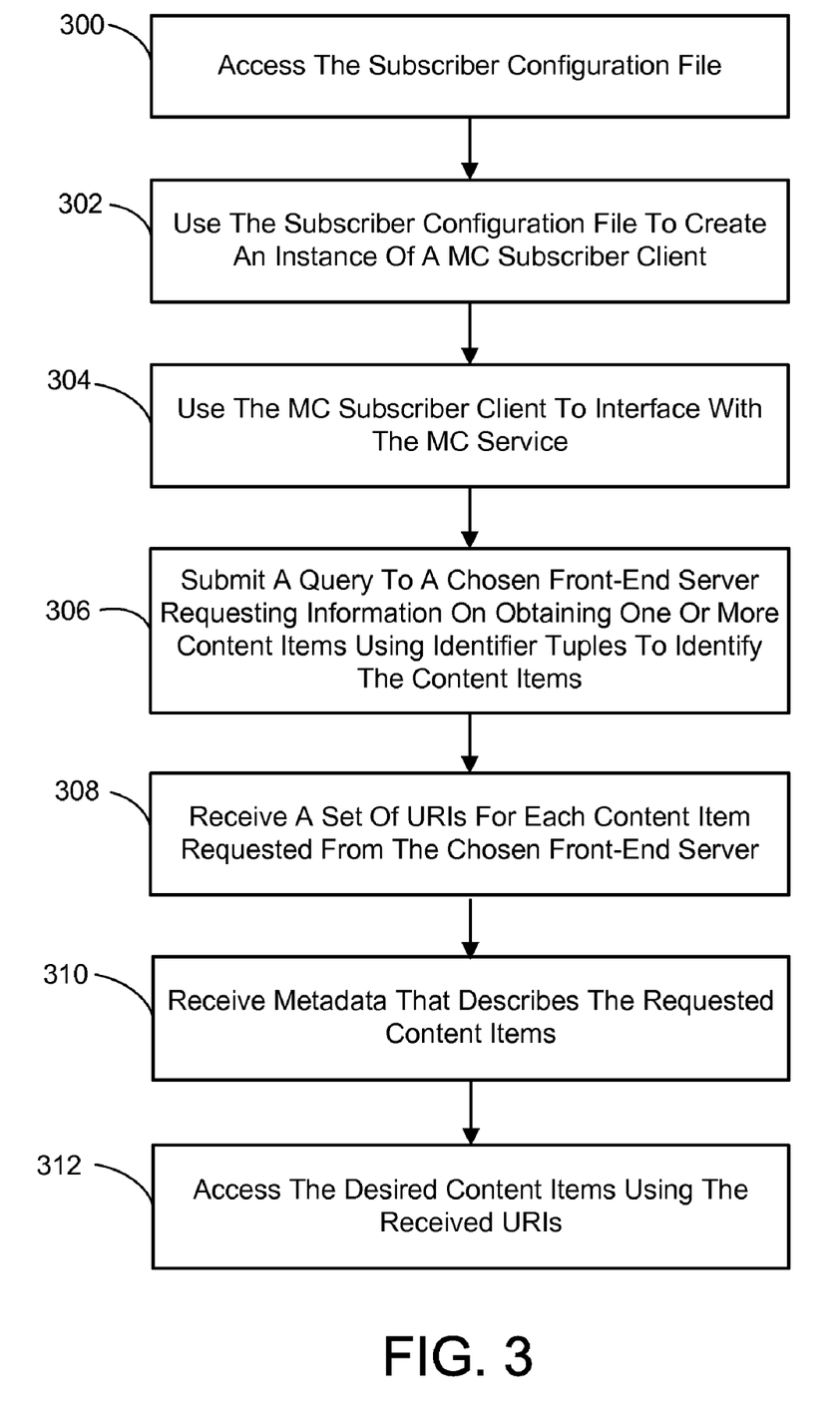
FIG. 3 is a flow diagram generally outlining one implementation of a process by which a subscriber accesses and uses the MC service.

More particularly, in one exemplary implementation outlined in FIG. 3, a subscriber via a computing device accesses the aforementioned subscriber configuration file (300). This configuration file is initially obtained by the subscriber as part of the process of signing up for the MC service, and as indicated previously updates are provided as needed by the MC service. The sign-up process is done in a conventional manner and so will not be described in detail. The subscriber configuration file is used by the subscriber's computing device to create an instance of a media collections (MC) subscriber client (302). The subscriber then employs the MC subscriber client to interface with the MC service (304). In one implementation this involves identifying one of the front-end servers listed in the subscriber configuration file. The subscriber then submits a query (e.g., an odata query) to the chosen front-end server requesting information on obtaining one or more media items using the previously-described identifier tuples (306). It is noted that the media item representation identifier tuples that a subscriber uses in making the query are obtained separately. For example, assume a subscriber wants to play a third party multi-media presentation that requires the subscriber to obtain and download various media items in order to view the presentation. This third party presentation author would provide the identifier tuples needed to obtain the URIs for the media items from the MC service.

The subscriber next receives one or more URIs for each media item representation requested from the chosen front-end server (308). As stated previously, the received URI or URIs can generally be used to directly access one of the requested media item representations. In addition, as indicated previously, the subscriber may optionally receive metadata that describes the requested media item representations (310). The optional nature of this last action is indicated by the dashed line box shown in FIG. 3. The subscriber then accesses the desired media using the received URIs (312).

1.3.1 Subscriber-Side Load Balancing

Figure 4:
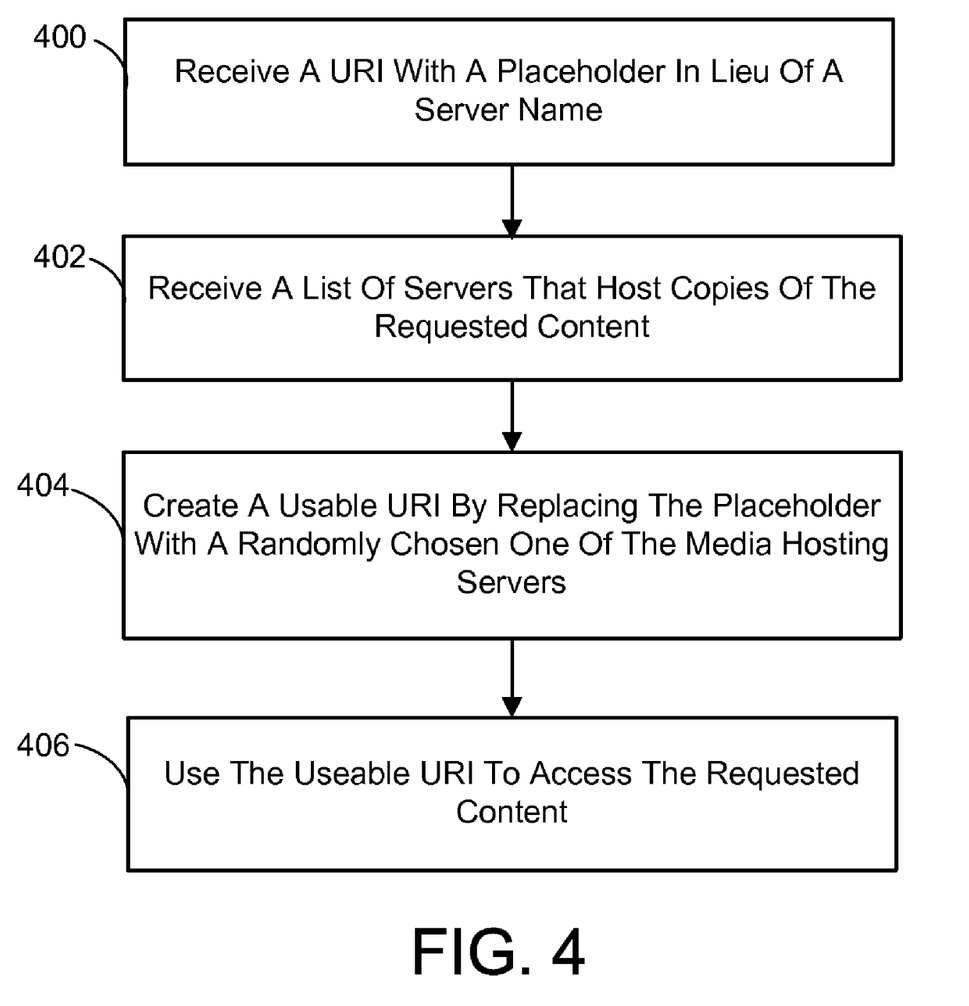
FIG. 4 is a flow diagram generally outlining one implementation of a process by which a subscriber accesses the desired media using URIs received from the MC service which employs a subscriber-side load balancing scheme.

It is noted that in one implementation of the MC service, a subscriber-side load balancing scheme is employed. Generally, this involves the MC service providing a subscriber with URIs that do not specify the name of the server where the media item representation can be obtained. Instead the subscriber also receives a list of servers where an instance of the media item representation can be found. The subscriber then randomly chooses one of the identified servers, inserts its identity into the URI and accesses the media. This random selection of a server among multiple servers where copies of the requested media item representation reside tends to spread the media requests out across the multiple servers so that no one server is overtaxed. More particularly, referring to FIG. 4, in one implementation of the foregoing action of accessing the desired media using the received URIs (see action 312 of FIG. 3), the subscriber receives each URI with placeholders for the server name (400). The subscriber also receives a list of servers that host copies of the requested content (402). For example, the subscriber might receive the URI "{http://SMOOTH_STREAMING_SERVER/bigbunny.wmv, SMOOTH_STREAMING_SERVER=[SSserver1, SSserver2]}. The subscriber then creates a content URI by replacing the placeholder with a randomly chosen one of the media hosting servers (404) and accesses the media (406).

It is noted that the aforementioned master repository back-end server maintains a table that lists placeholder names and server names associated with them. In one implementation, this table is replicated on the front-end servers, who in turn use the table to provide the aforementioned list of servers that host copies of the requested content to a subscriber along with the placeholder URIs. It is further noted that in one implementation the URI or URIs associated with each media item representation are stored in the MC database in their placeholder form when the foregoing subscribed-side load balancing scheme is employed.

1.3.2 Subscriber-Side Libraries

Figure 5:
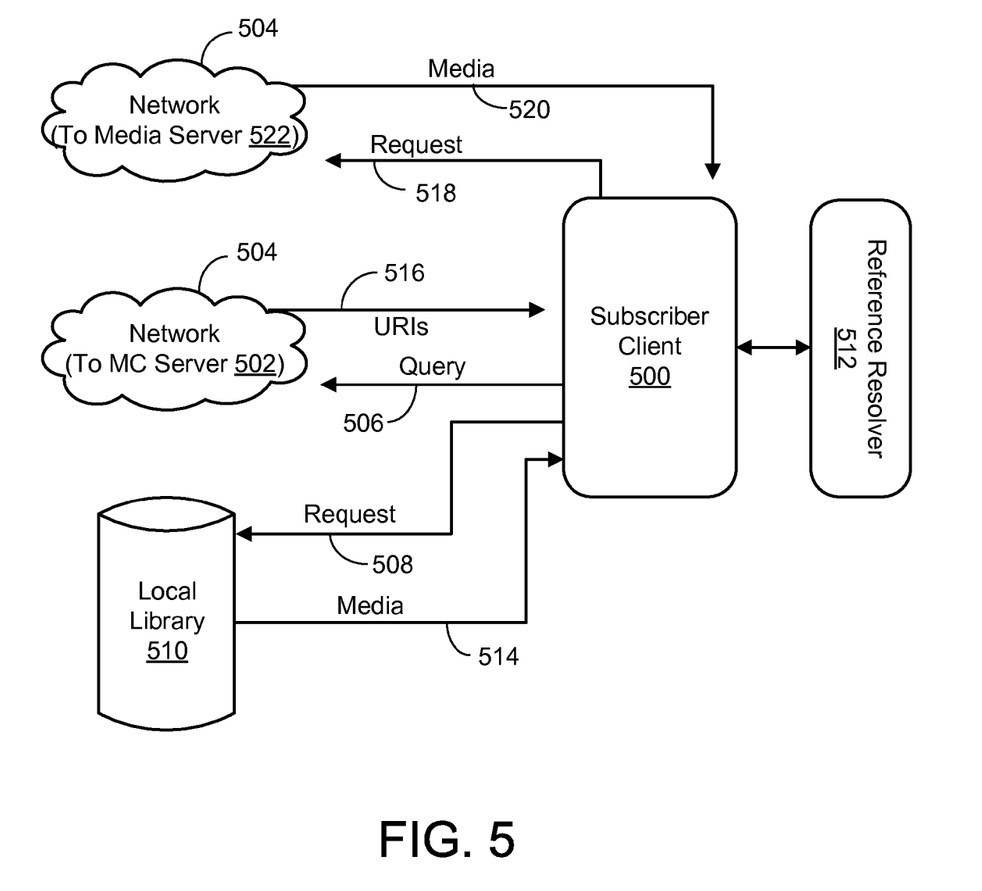
FIG. 5 is a simplified architectural diagram of one implementation of a common subscriber interface which either accesses the MC service to query for information on where a content item can be obtained, or to directly request the item from a local library.

It is possible that some of the media item representations corresponding to a subscriber query can be obtained locally. For example, media item representations might be available from a local library of media content which has been made available out of band (perhaps by connecting an external hard disk or DVD). In view of this, in one exemplary implementation shown in FIG. 5, the aforementioned subscriber client 500 can function as a common interface to either, access the MC service 502 via a computer network 504 (such as the Internet) to query 506 for information on where a media item representation can be obtained, or to directly request 508 the media item representation from a local library 510. It is noted that the subscriber client utilizes a reference resolver 512 that maps the locally stored media item representation to a corresponding identifier tuple. In this way the subscriber client uses the identifier tuple to first determine if the corresponding media item representation is available locally. If so, the subscriber client obtains the media 514 from local library 510 using the mapping information from the reference resolver 512. If not, the subscriber client 500 queries 506 the MC service 502 as described previously to obtain a list of URIs for the media item representation 516, and then requests 518 the media from the appropriate server 522 via the network 504. The requested media 520 is then provided to the subscriber client 500 from the server 522 via the network 504.

1.4 MC Service Content Author

Figure 6:
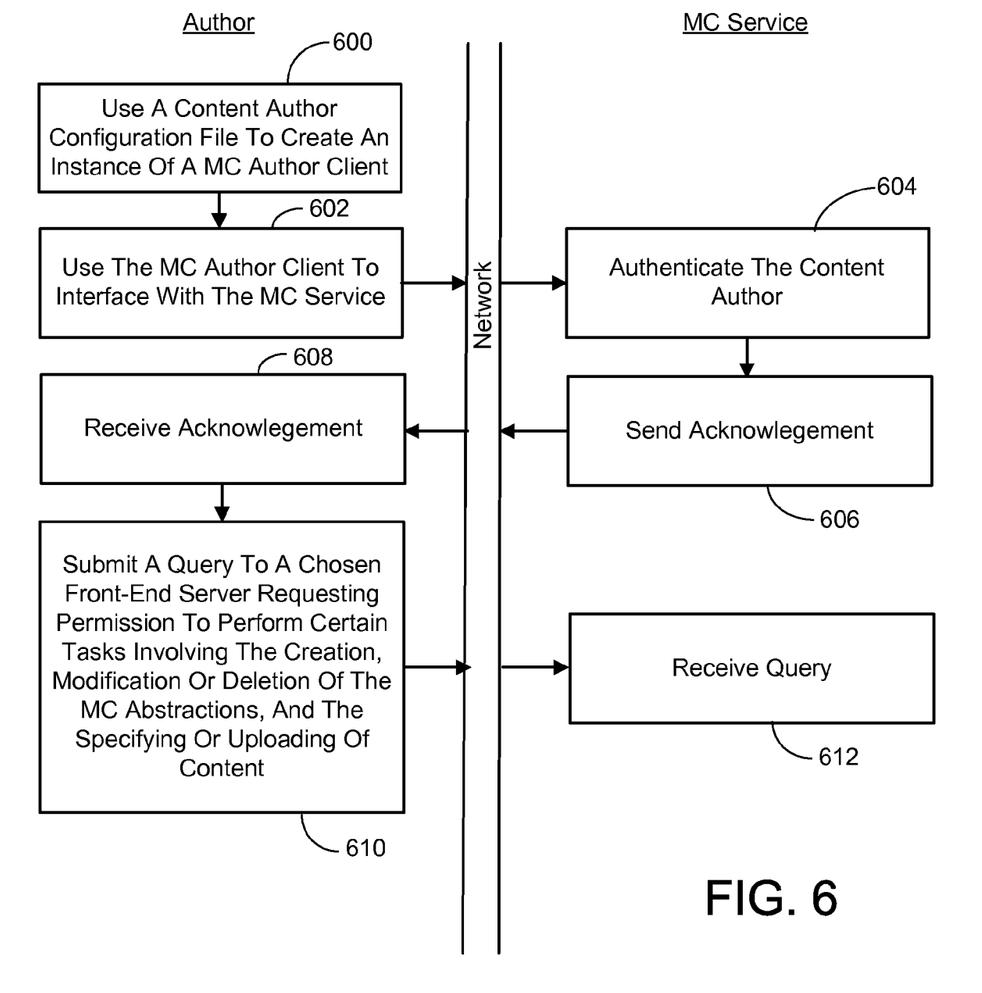
FIG. 6 is a flow diagram generally outlining one implementation of a process by which an author accesses and uses the MC service.

In general, a content author (i.e., an entity that publishes content) queries the MC service via a computing device (such as the computing devices described in the Exemplary Operating Environments section to follow) to request permission to specify and possibly upload authored content. In one exemplary implementation outlined in FIG. 6, a content author configuration file, which is provided to the author at sign-up, is used by the author's computing device to create an instance of a media collections (MC) author client (600). The content author then employs the MC author client to interface with the MC service via a computer network (602). In one version, this involves choosing one of the aforementioned front-end servers, which are listed in the content author configuration file. The MC service authenticates the content author using information obtained when the author signed-up with the service (604). It is noted that the sign-up and authentication processes are done in a conventional manner and so will not be described in detail. The MC service then sends an authentication acknowledgement to the author (606). The content author receives the acknowledgement (608) and then submits a query (e.g., an odata query) to the chosen front-end server requesting permission to perform certain tasks involving the creation, modification or deletion of the aforementioned MC abstractions, and the specifying or uploading of content (610). The MC service receives the query (612), and processes it as will be described next.

The aforementioned tasks of creating a MC abstraction entails, in one implementation, adding a new collection, along with its corresponding media items and representations thereof. The previously described identities (collectionID, itemID and contentID) for these abstractions are established as part of this creation process. In one version, this entails the content author assigning the identities according to some prescribed naming scheme established by the MC service. In another version, the content author requests that the MC service assign the identities and provide a list of these assignments. The aforementioned tasks of modifying or deleting a MC abstraction entails, in one implementation, the content author modifying or deleting existing collections, or the corresponding media items or representations, or both. Still further, in one implementation, the content author can add, modify or delete metadata associated with a collection, or a media item.

In one implementation, the aforementioned task of specifying content involves the content author providing the MC service with identifier tuples identifying content and a list of URIs that can be used to directly access the particular media item representation corresponding to each of the provided identifier tuples. Metadata that describes the media items can also be provided to the MC service. The MC service can then obtain and replicate the content on other servers (which can include third-party sites) or in the cloud, for the purpose of client-side load balancing as was described previously. The URIs associated with these replicated sites would then be added to the list of URIs associated with the content.

In one implementation, the aforementioned task of uploading content involves the content author's query providing identifier tuples identifying content and either providing the identified content or requesting the MC service to download the identified content. The identified content is then stored in one or more places (which can include third-party sites), and URIs are established for each of the stored representations. In one implementation, this involves uploading content to the backend server, which then replicates the content onto front end servers. In one implementation, the content author can also provide metadata associated with a collection, or a media item.

It is noted that for large or complex media items, such as a deep zoom tileset which can contain thousands of images, a conventional incremental upload scheme can be employed. This can involve establishing a content author-side library to package and upload media in chunks. The upload mechanism can be intelligent about incremental updates and can support resuming of updates after planned or unplanned disconnection with the MC service. It is further noted that content would only be uploaded if it does not already exist in the service, and the MC service can also perform content-specific validation of the content to help guard against malicious content (e.g., embedded viruses) and in general help ensure a better player experience.

2.0 Exemplary Operating Environments

Figure 7:
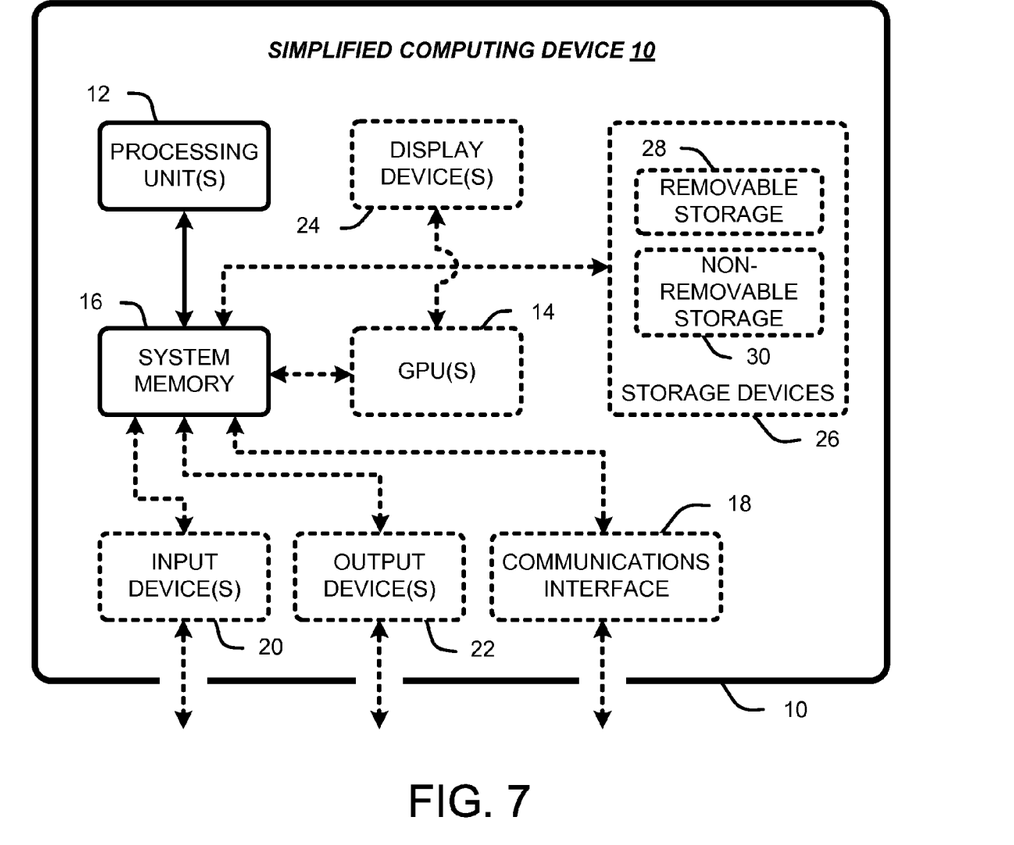
FIG. 7 is a diagram depicting a general purpose computing device constituting an exemplary system for implementing media collection service embodiments described herein.

The media collection service embodiments described herein are operational within numerous types of general purpose or special purpose computing system environments or configurations. FIG. 7 illustrates a simplified example of a general-purpose computer system on which various embodiments and elements of the media collection service embodiments, as described herein, may be implemented. It should be noted that any boxes that are represented by broken or dashed lines in FIG. 7 represent alternate embodiments of the simplified computing device, and that any or all of these alternate embodiments, as described below, may be used in combination with other alternate embodiments that are described throughout this document.

For example, FIG. 7 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, mini-computers, mainframe computers, audio or video media players, etc.

To allow a device to implement the media collection service embodiments described herein, the device should have a sufficient computational capability and system memory to enable basic computational operations. In particular, as illustrated by FIG. 7, the computational capability is generally illustrated by one or more processing unit(s) 12, and may also include one or more GPUs 14, either or both in communication with system memory 16. Note that that the processing unit(s) 12 of the general computing device of may be specialized microprocessors, such as a DSP, a VLIW, or other microcontroller, or can be conventional CPUs having one or more processing cores, including specialized GPU-based cores in a multi-core CPU.

In addition, the simplified computing device of FIG. 7 may also include other components, such as, for example, a communications interface 18. The simplified computing device of FIG. 7 may also include one or more conventional computer input devices 20 (e.g., pointing devices, keyboards, audio input devices, video input devices, haptic input devices, devices for receiving wired or wireless data transmissions, etc.). The simplified computing device of FIG. 7 may also include other optional components, such as, for example, one or more conventional display device(s) 24 and other computer output devices 22 (e.g., audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 7 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the media collection service described herein, or portions thereof, may be stored, received, transmitted, or read from any desired combination of computer or machine readable media or storage devices and communication media in the form of computer executable instructions or other data structures.

Finally, the media collection service embodiments described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

3.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A media collections (MC) service system for resolving an identifier tuple assigned to a content item into a set of one or more Uniform Resource Identifiers (URIs) which point to an instance of the content item, said system comprising:
   a back-end server which acts as a master repository for a MC service configuration and a MC database, wherein the MC service configuration sets up an instance of a MC service on a front-end server, and wherein the MC database comprises a listing of identifier tuples each of which is assigned to a content item and each of which is associated with a set of one or more URIs that point to locations where an instance of the identified content item can be obtained;
   multiple front end servers which interface with the back-end server and which each comprise an instance of the MC service set-up by the back-end server and which have access to a copy of the MC database as provided by the back-end server, and wherein each front-end server receives queries from a subscriber comprising an identifier tuple and uses the resident instance of the MC service and the MC database to provide one or more URIs associated with the received identifier tuple to the subscriber.

2. The MC service system of claim 1, wherein at least one of the front-end servers is hosted on a dedicated computing device accessible by the subscriber, and wherein a copy of the MC database is resident on the dedicated computing device.

3. The MC service system of claim 1, wherein at least one of the front-end servers is hosted in a cloud-based service accessible by the subscriber, and wherein a copy of the MC database is resident in a cloud-based service and accessible by the cloud-based front-end server.

4. The MC service system of claim 1, wherein each of said identifier tuples comprises:
   a collection identity element that identifies a particular media collection, among one or more media collections referenced in the MC database;
   a media item identity element that identifies a particular media item, among one or more media items in the media collection identified in the tuple, to which the content item belongs; and
   a content reference identity element that identifies a particular representation of the media item identified in the tuple, among one or more representations associated with the media item identified in the tuple, that corresponds to the content item.

5. The MC service system of claim 4, wherein the MC database further comprises, for each media collection, collection metadata which describes that collection.

6. The MC service system of claim 4, wherein the MC database further comprises, for each media item, media item metadata which describes that media item and its associated representations.

7. The MC service system of claim 4, wherein the media item representations point to versions of the same content in at least one of different resolutions, or alternative file formats, or different languages.

8. The MC service system of claim 1, wherein said content item comprises one of text, or an image, or a video, or a deep zoom image, or a photosynth, or a HTML page with embedded Cascading Style Sheets (CSS)/Javascript/images, or a memory dump file potentially made up of multiple dump files, or an XML file that has metadata.

9. The MC service system of claim 1, wherein each of said identifier tuples further comprises an authority identity element which identifies the content item as being owned by a single entity.

10. A computer-implemented process for a subscriber to access a content item, comprising:
   using a computer to perform the following process actions:
   accessing a subscriber configuration file previously obtained from a media collections (MC) service;
   using the subscriber configuration file to create an instance of a MC subscriber client;
   using the MC subscriber client to initiate communications with the MC service;
   submitting a query to the MC service comprising an identifier tuple which identifies a content item the subscriber wants to obtain if the content item is not stored locally; and
   whenever a query is submitted,
      receiving from the MC service a set of one or more Uniform Resource Identifiers (URIs) which point to an instance of the content item corresponding to the identifier tuple presented to the MC service in the query, and
      accessing the content item using the one or more of the received URIs.

11. The process of claim 10, wherein the subscriber configuration file further comprises a list of available front-end servers hosting an instance of the MC service, and wherein the process action of using the MC subscriber client to initiate communications with the MC service, comprises an action of initiating communications with the MC service hosted on a randomly chosen one of the front-end servers listed in the subscriber configuration file.

12. The process of claim 10, wherein each of said identifier tuples comprises at least one of a collection identity element that identifies a particular media collection, among one or more media collections referenced in the MC database, a media item identity element that identifies a particular media item, among one or more media items in the media collection identified in the tuple, to which the content item belongs, and a content reference identity element that identifies a particular representation of the media item identified in the tuple, among one or more representations associated with the media item identified in the tuple, that corresponds to the content item, and wherein the action of submitting a query to the MC service, comprises submitting at least one of:
  submitting one or more additional identifier tuples; or
  submitting an identifier tuple which only specifies the collection identity element, thereby requesting information for all the media item representations in a particular collection; or
  submitting an identifier tuple which only specifies the collection identity element and the media item identity element, thereby requesting information for all the representations of the identified media item in the identified collection; or
  submitting an identifier tuple which only specifies the collection identity element thereby requesting information for the media item representations in a particular collection, and a metadata condition which specifies that only those content items that satisfy the metadata condition are requested; or
  submitting an identifier tuple which only specifies the collection identity element and the media item identity element, thereby requesting information for the representations of the identified media item in the identified collection, and a metadata condition which specifies that only those content items that satisfy the metadata condition are requested.

13. The process of claim 10, further comprising a process action of receiving from the MC service, metadata that provides information about the content item corresponding to the identifier tuple presented to the MC service in the query.

14. The process of claim 10, wherein URIs received from the MC service comprise a placeholder in lieu a name of a server, and wherein the process action of accessing the content item using the one or more of the received URIs comprises the actions of:
  for each placeholder found in the received URIs, receiving from the MC service along with the URIs, a list of server names corresponding to the placeholder;
  for each of the received URIs,
    randomly selecting one of the servers from the list of servers corresponding to the placeholder of the URI, and
    replacing the placeholder in the URI with the selected server name;
  accessing the content item using the one or more URIs with the replaced placeholder or placeholders, so as to effect a subscriber-side load balancing scheme.

15. The process of claim 10, wherein the content item the subscriber wants is stored locally, and wherein prior to performing the process action of submitting a query to the MC service, the process further comprises performing the actions of:
  employing a reference resolver that maps locally stored content items to corresponding identifier tuples to determine if the content item associated with the identifier tuple included in a query is stored locally; and
  whenever it is determined the content item associated with the identifier tuple included in the query is stored locally, obtaining the content item locally rather than submitting a query to the MC service.

16. A computer-implemented process for a content author to specify or upload a content item, comprising:
  using a computer to perform the following process actions:
  accessing a content author configuration file previously obtained from a media collections (MC) service;
  using the content author configuration file to create an instance of a MC author client;
  using the MC author client to initiate communications with the MC service;
  submitting a query to the MC service requesting permission to perform tasks involving the creation or manipulation of an identifier tuple which identifies a content item, and specifying or uploading of the content item.

17. The process of claim 16, wherein the identifier tuple comprises a collection identity element that identifies a particular media collection among one or more media collections referenced in the MC database, a media item identity element that identifies a particular media item among one or more media items in the media collection identified in the tuple to which the content item belongs, and a content reference identity element that identifies a particular representation of the media item identified in the tuple among one or more representations associated with the media item identified in the tuple that corresponds to the content item, and wherein creating an identifier tuple comprises an action of the content author assigning the collection, media item and content reference identity elements according to a prescribed identity naming scheme.

18. The process of claim 16, wherein the identifier tuple comprises a collection identity element that identifies a particular media collection among one or more media collections referenced in the MC database, a media item identity element that identifies a particular media item among one or more media items in the media collection identified in the tuple to which the content item belongs, and a content reference identity element that identifies a particular representation of the media item identified in the tuple among one or more representations associated with the media item identified in the tuple that corresponds to the content item, and wherein creating an identifier tuple comprises an action of the content author requesting that the MC service assign the collection, media item and content reference identity elements and provide a list of the assignments to the content author.

19. The process of claim 16, wherein specifying a content item comprises the actions of:
  the content author providing the MC service with an identifier tuple identifying the content item and a list of one or more URIs that can be used to access the content item; and
  the content author providing the MC service with metadata that describes the content item.

20. The process of claim 16, wherein uploading a content item comprises the actions of:
  the content author providing the MC service with an identifier tuple identifying the content item and either providing the identified content or requesting the MC service to download the identified content, and then storing it and establishing URIs for the stored content item; and
  the content author providing the MC service with metadata that describes the content item.

* * * * *